United States Patent
Shibuki (10) Patent No.: US 8,739,571 B2
(45) Date of Patent: Jun. 3, 2014

(54) MANUFACTURING METHOD AND MANUFACTURING APPARATUS FOR MANUFACTURING OPTICAL ELEMENT

(75) Inventor: Hiroyuki Shibuki, Tokyo (JP)

(73) Assignee: Olympus Corporation, Tokyo (JP)

( * ) Notice: Subject to any disclaimer, the term of this patent is extended or adjusted under 35 U.S.C. 154(b) by 41 days.

(21) Appl. No.: 13/188,850

(22) Filed: Jul. 22, 2011

(65) Prior Publication Data

US 2012/0024011 A1    Feb. 2, 2012

(30) Foreign Application Priority Data

Jul. 30, 2010 (JP) ................. 2010-172491

(51) Int. Cl.
*C03B 11/12* (2006.01)
*C03B 40/02* (2006.01)
*C03B 23/00* (2006.01)

(52) U.S. Cl.
CPC ............ *C03B 23/0013* (2013.01); *C03B 40/02* (2013.01); *C03B 2215/50* (2013.01); *C03B 2215/66* (2013.01)
USPC ............................................. 65/25.1; 65/169

(58) Field of Classification Search
CPC .. C03B 11/122; C03B 23/0013; C03B 40/02; C03B 2215/50; C03B 2215/63; C03B 2215/66; C03B 2215/68; C03B 2215/69
USPC ............................................. 65/25.1, 84, 169
See application file for complete search history.

(56) References Cited

U.S. PATENT DOCUMENTS

| | | | |
|---|---|---|---|
| 5,032,159 A | 7/1991 | Kuwabara et al. | |
| 5,616,161 A * | 4/1997 | Morikita | 65/157 |
| 5,720,791 A * | 2/1998 | Miyaura | 65/37 |
| 2010/0000258 A1 | 1/2010 | Jeng et al. | |

FOREIGN PATENT DOCUMENTS

| | | |
|---|---|---|
| JP | H03-153531 A | 7/1991 |
| JP | H07-315853 A | 12/1995 |
| JP | 2001-158639 A | 6/2001 |
| JP | 2008-120645 A | 5/2008 |
| JP | 2010-013349 A | 1/2010 |
| JP | 2010-018501 A | 1/2010 |

OTHER PUBLICATIONS

Japanese Office Action issued for counterpart application JP 2010-172491, mailing date Nov. 19, 2013 (with English translation).

* cited by examiner

*Primary Examiner* — Matthew Daniels
*Assistant Examiner* — Cynthia Szewczyk
(74) *Attorney, Agent, or Firm* — Dickstein Shapiro LLP (57) ABSTRACT

A manufacturing method for manufacturing an optical element includes: supplying a gas containing a mold-release acceleration substance to the space between a first mold and a second mold which sandwich an optical material and face each other; and pressurizing and transforming the optical material by bringing the first and second molds relatively close to each other.

7 Claims, 9 Drawing Sheets

MANUFACTURING METHOD AND MANUFACTURING APPARATUS FOR MANUFACTURING OPTICAL ELEMENT

CROSS REFERENCE TO RELATED APPLICATIONS

This application is based upon and claims the benefit of priority from prior Japanese Patent Application No. 2010-172491, filed Jul. 30, 2010, the entire contents of which are incorporated herein by reference.

BACKGROUND OF THE INVENTION

1. Field of the Invention

The present invention relates to a manufacturing method and a manufacturing apparatus for manufacturing an optical element such as a lens, prism, or mirror.

2. Description of the Related Art

Conventionally, in a process for transforming a glass material that has been softened via heating into a desired shape using pressure, the glass material and a mold have been fusion-bonded to each other in accordance with the combination of the glass material and the material of the mold. The fusion degrades the surface roughness of the mold, and hence a problem of tarnishing of the optical element is also caused.

In order to prevent the occurrence of the fusion and the tarnishing defect described above, a method is proposed in which, in a vacuum apparatus including an excitation means for generating plasma, various processes are performed on the surface layer of a piece of glass so that mold-release characteristics are improved to prevent an occurrence of fusion and so that degradation of the mold is minimized to prevent an occurrence of a tarnishing defect (see, for example, Patent Document 1).

Patent Document 1: Japanese Laid-open Patent Publication No. 2001-158639

SUMMARY OF THE INVENTION

A manufacturing method for manufacturing an optical element according to the present invention includes: supplying a gas containing a mold-release acceleration substance to the space between a first mold and a second mold which sandwich an optical material and face each other; and pressurizing and transforming the optical material by bringing the first and second molds relatively close to each other.

The manufacturing method for manufacturing an optical element may include heating and softening the optical material by heating a heating and softening gas and supplying it to the space between the first and second molds, wherein the heating and softening the optical material is performed before the pressurizing and transforming the optical material.

In the manufacturing method for manufacturing an optical element, the gas containing a mold-release acceleration substance may be a mixed gas which is a mixture of the heating and softening gas and the mold-release acceleration substance.

In the manufacturing method for manufacturing an optical element, the heating and softening gas may be heated via the mixed gas being heated.

In the manufacturing method for manufacturing an optical element, at least a portion of the supplying the gas containing the mold-release acceleration substance may be performed simultaneously with the heating and softening the optical material.

In the manufacturing method for manufacturing an optical element, the heating and softening gas may be heated after it is mixed with the mold-release acceleration substance.

In the manufacturing method for manufacturing an optical element, the heating and softening gas may be heated before it is mixed with the mold-release acceleration substance.

In the manufacturing method for manufacturing an optical element, the gas containing the mold-release acceleration substance may be supplied to the space between the first and second molds separately from the heating and softening gas.

In the manufacturing method for manufacturing an optical element, the supplying the gas containing the mold-release acceleration substance may include changing the amount of the supplied mold-release acceleration substance in the process of changing the shape of the optical material.

In the manufacturing method for manufacturing an optical element, the mold-release acceleration substance may be a hydrocarbon, boron nitride, or graphite, or may be obtained by a reaction of a hydrocarbon or a halogenated hydrocarbon in a raw material form.

In the manufacturing method for manufacturing an optical element, the mold-release acceleration substance may be generated via a reaction of the raw material for the mold-release acceleration substance which is caused by heating the raw material.

A manufacturing apparatus according to the present invention for manufacturing an optical element includes: a mold-release acceleration gas supply unit configured to supply a gas containing a mold-release acceleration substance to the space between a first mold and a second mold which sandwich an optical material and face each other; and a pressurization unit configured to pressurize and transform the optical material by bringing the first and second molds relatively close to each other.

DESCRIPTION OF THE PREFERRED EMBODIMENT

The surface area of an optical material is typically smaller than that of an optical element. This is because, as the optical material is pressurized and transformed more by a pair of molds, the intervals between atoms and molecules on the surface of the optical material become longer so that the surface of the optical material is partially cleaved, with the result that a new surface is formed.

As described above, as an optical material is transformed more, a newer surface is formed on it; accordingly, even if an attempt is made to surface-treat an optical material as described in Patent Document 1 in order to improve mold-release characteristics between a mold and the optical material, a portion of the optical material cannot be surface-treated. This portion adheres to the mold, and fusion bonding of the optical material and the mold spreads from this portion. Eventually, the surface roughness of the mold is degraded, thereby causing a tarnishing defect of the optical element.

In the following, a manufacturing method and a manufacturing apparatus for manufacturing an optical element according to embodiments of the present invention will be described with reference to the drawings.

FIRST EMBODIMENT

Figure 1:
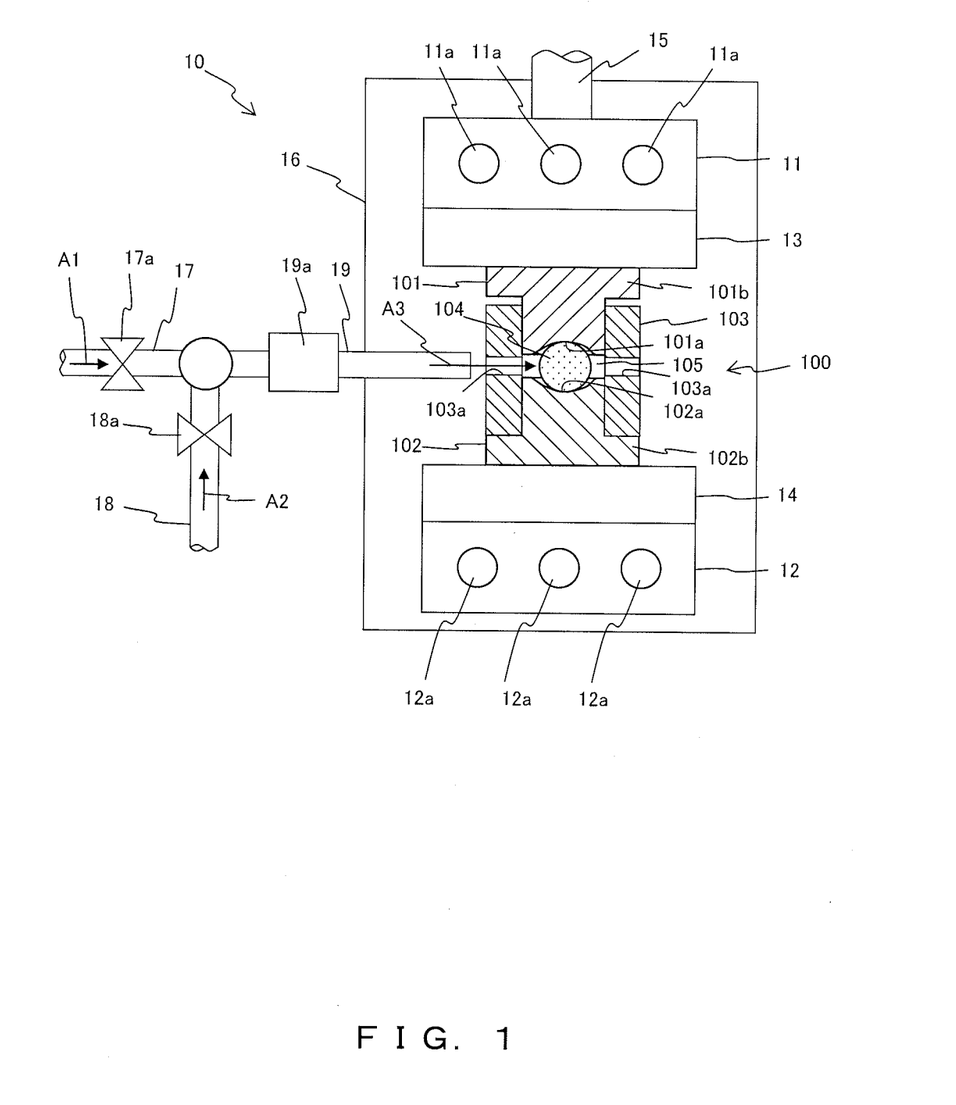
FIG. 1 is a schematic configuration diagram illustrating a manufacturing apparatus for manufacturing an optical element according to a first embodiment of the present invention.

FIG. 1 is a schematic configuration diagram illustrating a manufacturing apparatus 10 for manufacturing an optical element according to a first embodiment of the present invention.

As illustrated in FIG. 1, the manufacturing apparatus 10 for manufacturing an optical element includes: an upper heating block 11; a lower heating block 12; an upper soaking plate 13; a lower soaking plate 14; an ascending and descending axis 15; a molding chamber 16; an inert gas supply path 17; a mold-release acceleration gas supply path 18; and a mixed gas supply path 19.

A plurality of stages, including the upper heating block 11, the lower heating block 12, the upper soaking plate 13, the lower soaking plate 14, and the ascending and descending axis 15, are placed in the molding chamber 16 of the manufacturing apparatus 10 for manufacturing an optical element. A mold set 100, which will be described later, is, for example, transported to one or more heating stages, one or more pressurizing stages, and one or more cooling stages, in this order. The inert gas supply path 17, the mold-release acceleration gas supply path 18, and the mixed gas supply path 19 are placed in, for example, the heating stage and the pressurizing stage.

The upper heating block 11 and the lower heating block 12 have, for example, three heaters 11a and three heaters 12a inserted into them, wherein the three heaters 11a and the three heaters 12a serve as both heating units for heating an optical material 104 and cooling units for cooling the optical material 104, and wherein the optical material 104 is, for example, glass. The temperatures of the heaters 11a and 12a are controlled by a control unit (not illustrated).

The upper soaking plate 13 is fixed at the lower part of the upper heating block 11 and the lower soaking plate 14 is fixed at the upper part of the lower heating block 12. Heat produced by the heaters 11a and 12a and conducted via the upper heating block 11 and the lower heating block 12 is dispersed and conducted to surfaces in contact with the mold set 100 by the upper soaking plate 13 and the lower soaking plate 14.

The ascending and descending axis 15 constitutes a pressurization unit together with a drive unit (not illustrated) which is, for example, a cylinder. The bottom end of the ascending and descending axis 15 is fixed on the upper heating block 11, and the ascending and descending axis 15 ascends and descends together with the upper heating block 11 and the upper soaking plate 13. While the ascending and descending axis 15 is descending, it pressurizes and transforms an optical material 104 which is accommodated in the mold set 100 and which is, for example, glass.

The mold set 100 includes an upper mold 101 as a first mold, a lower mold 102 as a second mold, and a sleeve 103.

On the end surfaces of the upper mold 101 and the lower mold 102 which face each other, concave mold surfaces 101a and 102a are formed for impressing a double-convex shape onto the optical material 104.

The upper mold 101 has a circular cylindrical shape, and a large diameter part 101b is formed at the upper end of this shape. The lower mold 102 has a circular cylindrical shape, and a large diameter part 102b is formed at the lower end of this shape.

The sleeve 103 has a circular cylindrical shape, and it is placed between the large diameter part 101b of the upper mold 101 and the large diameter part 102b of the lower mold 102 and holds the upper mold 101 and the lower mold 102.

The sleeve 103 has a plurality of through-holes 103a formed in it, and these holes cause a cavity 105, which is the space between the upper mold 101 and the lower mold 102, to be in communication with the molding chamber 16. The through-holes 103a extend in the radial direction of the sleeve 103 and form openings on the outer surface and the inner surface of the sleeve 103.

The number of the through-holes 103a is a number such that a mixed gas A3 can inflow and outflow, and it is, for example, two or larger. When the shape of each of the through-holes 103a is, for example, an elongated circle, the number of the through-holes 103a may be one.

The inert gas supply path 17 constitutes a channel for supplying an inert gas A1 (a heating and softening gas), which is, for example, nitrogen or helium, from a supply source (not illustrated) to the cavity 105.

The mold-release acceleration gas supply path 18 constitutes a channel for supplying a mold-release acceleration gas A2, which is a gas containing a mold-release acceleration substance, from a supply source (not illustrated) to the cavity 105. The mold-release acceleration substance itself may be a gas (the mold-release acceleration gas A2), a solid such as a powder, or a liquid.

The inert gas supply path 17 and the mold-release acceleration gas supply path 18 are provided with adjustment valves 17a and 18a, which are controlled by a control unit (not illustrated) to adjust the flow rate.

The inert gas supply path 17 and the mold-release acceleration gas supply path 18 are coupled to the mixed gas supply path 19. The mixed gas supply path 19 constitutes a channel for supplying, to the cavity 105, a mixed gas A3 which is a mixture of the inert gas A1 supplied by the inert gas supply path 17 and the mold-release acceleration gas A2 (the mold-release acceleration substance) supplied by the mold-release acceleration gas supply path 18.

As described above, the mold-release acceleration gas supply path 18 and the mixed gas supply path 19 together function as a mold-release acceleration gas supply unit which supplies a gas containing a mold-release acceleration substance to the cavity 105. As an example, when a mold-release acceleration substance is included in a filter placed in a supply path through which a gas, such as the inert gas A1, is supplied, the mixed gas A3 may be generated via the gas flow causing the mold-release acceleration substance in the filter to flow into the gas.

The mixed gas supply path 19 is provided with a gas-heating heater 19a. The gas-heating heater 19a is, for example, a torch heater using a platinum heating element.

The mold-release acceleration gas A2 within the mold-release acceleration gas supply path 18 is heated by the gas-heating heater 19a of the mixed gas supply path 19. Accordingly, a mold-release acceleration substance contained in the mold-release acceleration gas A2 may be a raw material while it is in the mold-release acceleration gas supply path 18. In this case, the gas-heating heater 19a functions as a mold-release-acceleration substance reacting unit which uses platinum as a catalyst, and the raw material for the mold-release acceleration substance reacts by being heated by the gas-heating heater 19a. As a result, the mold-release acceleration substance is generated. The mixed gas supply path 19 may be provided with a temperature adjustment mechanism which adjusts the temperature of the mixed gas A3 after the thermal reaction of the mold-release acceleration substance so that it is a temperature suitable for supplying the mixed gas A3 to the cavity 105.

The mold-release acceleration substance may be, for example, a halocarbon (graphite fluoride; $(CF)_n$), boron nitride (BN), or graphite (C).

A raw material for the mold-release acceleration substance may be, for example, a hydrocarbon ($CH_4$: methane, $C_2H_6$: ethane, $C_3H_8$: propane, $C_4H_{10}$: butane, $C_2H_4$: ethylene, $C_2H_2$: acetylene) or a halogenated hydrocarbon ($CH_2Cl_2$: dichloromethane, $C_2H_3Cl$: chloroethylene).

When the aforementioned gaseous raw material is used as a raw material for the mold-release acceleration substance, the supply concentration of the supplied raw material relative to the mixed gas A3 may be adjusted so that the volume quantity at the cavity 105 is preferably 0.01-50 vol %. This supply concentration is used since it is difficult to improve mold-release characteristics due to the reduction in generation of the mold-release acceleration substance (graphite) when the volume quantity is less than 0.01 vol % and since it is highly likely that a defect will appear on the surface of an optical element due to generation of too large an amount of mold-release acceleration substance when the volume quantity is greater than 50 vol %.

In the following, a flow for manufacturing an optical element from the optical material 104 will be described; for convenience sake, however, the points already described above are not repeated.

Figure 2A:
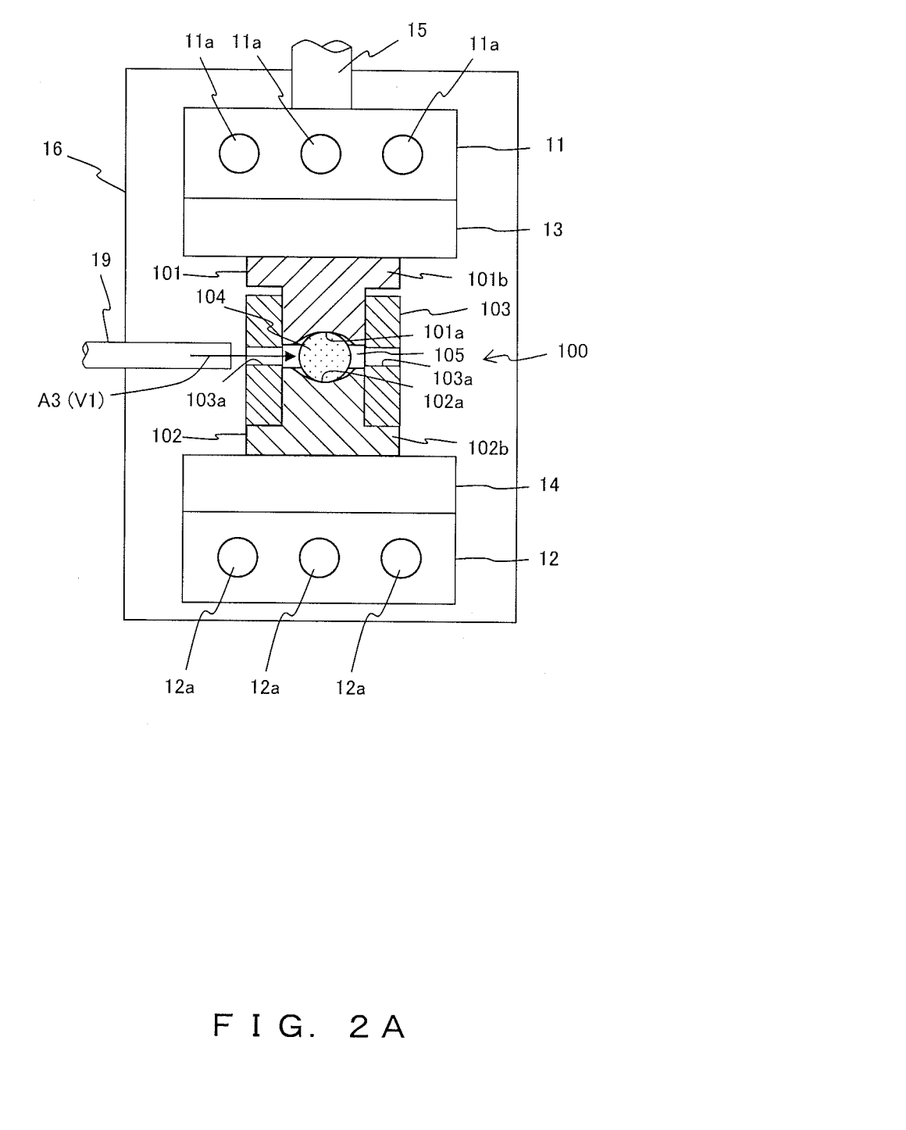
FIG. 2A is an explanatory diagram (pattern 1) illustrating a flow for manufacturing a double-convex lens with the manufacturing apparatus for manufacturing an optical element according to the first embodiment of the present invention.
Figure 2B:
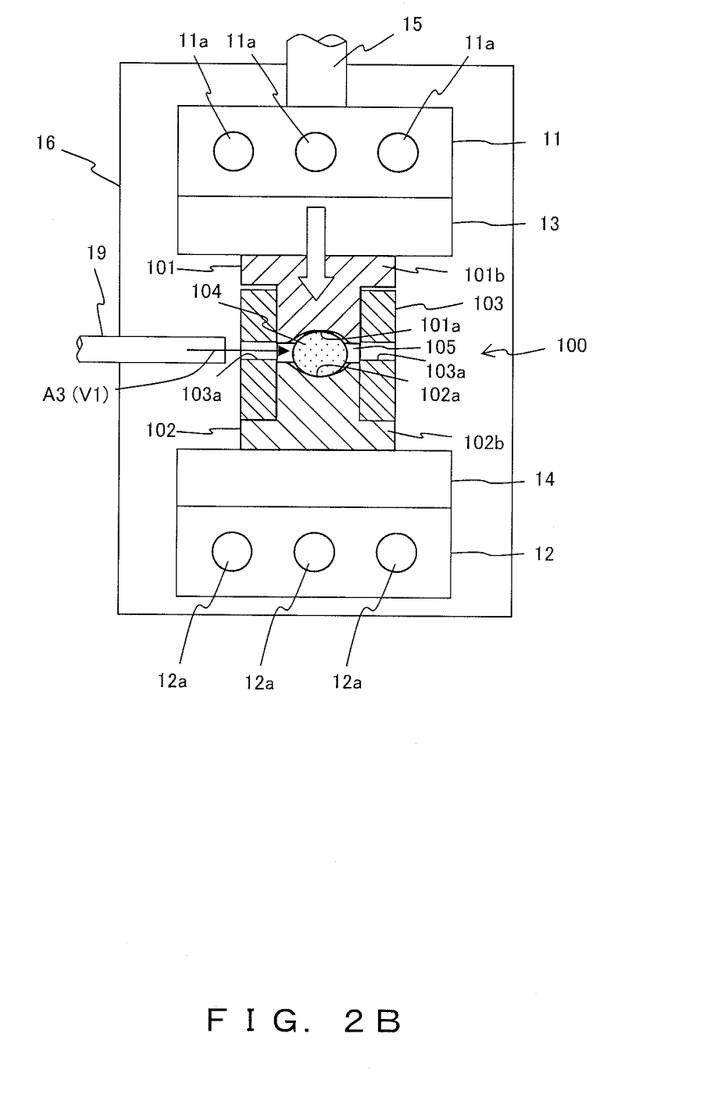
FIG. 2B is an explanatory diagram (pattern 2) illustrating a flow for manufacturing a double-convex lens with the manufacturing apparatus for manufacturing an optical element according to the first embodiment of the present invention.
Figure 2C:
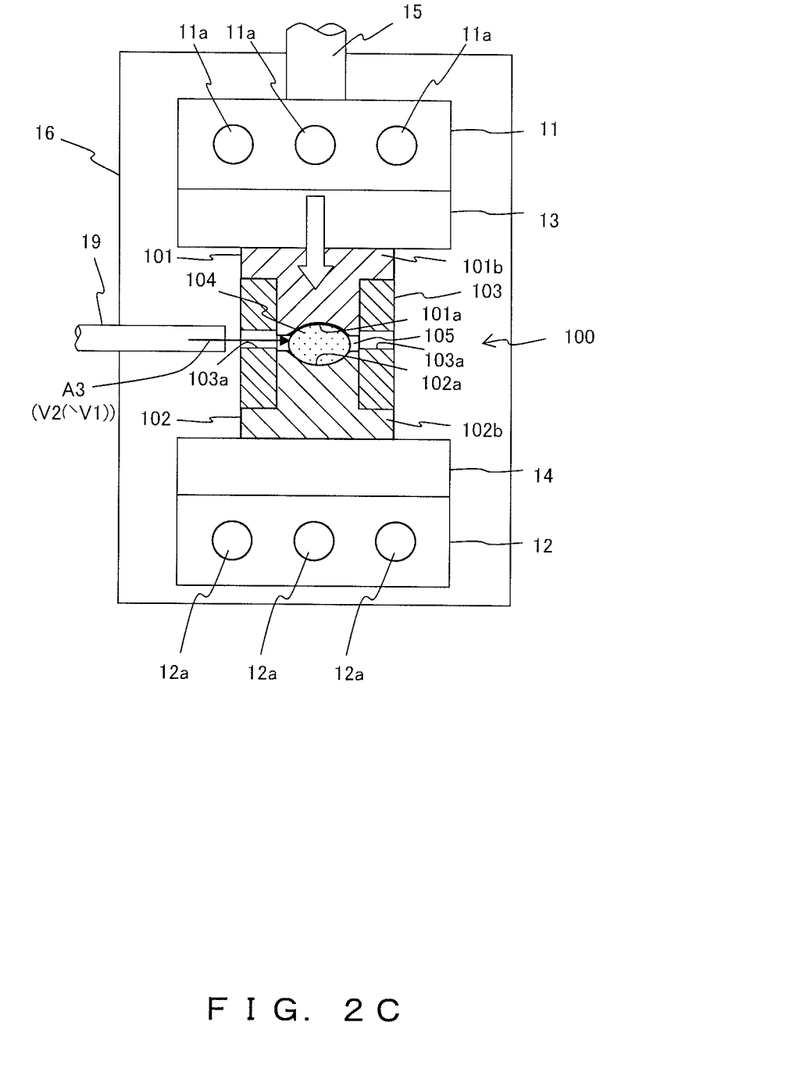
FIG. 2C is an explanatory diagram (pattern 3) illustrating a flow for manufacturing a double-convex lens with the manufacturing apparatus for manufacturing an optical element according to the first embodiment of the present invention.

FIGS. 2A-2C are each an explanatory diagram illustrating a flow for manufacturing an optical element, a double-convex lens, with the manufacturing apparatus 10 for manufacturing an optical element according to the first embodiment.

First, as illustrated in FIGS. 1 and 2A, the mold set 100, which accommodates the optical material 104 having, in this example, a spherical shape, is transported by a transportation robot (not illustrated) and placed on the lower soaking plate 14 within the molding chamber 16.

A drive unit (not illustrated) then causes the ascending and descending axis 15, the upper heating block 11, and the upper soaking plate 13 to descend, and the bottom surface of the upper soaking palate 13 abuts the top surface of the upper mold 101 of the mold set 100.

At the inert gas supply path 17 and the mold-release acceleration gas supply path 18, the adjustment valves 17a and 18a are opened via a control performed by a control device (not illustrated), thereby supplying an inert gas A1 and a mold-release acceleration gas A2 from a supply source (not illustrated) to the mixed gas supply path 19.

The mixed gas supply path 19 heats a mixed gas A3 (volume flow rate V1 $[m^3/s]$) with the gas-heating heater 19a and supplies it to the cavity 105. In this way, the mixed gas A3 containing a mold-release acceleration substance is supplied to the cavity 105 (a mold-release acceleration gas supplying step). When a raw material for the mold-release acceleration substance is in the mold-release acceleration gas A2 as described above, the mixed gas A3 may be heated at a temperature which is equal to or higher than the reaction temperature of the raw material (e.g., 1400 degrees C. or higher for acetylene) so that the raw material is heated so as to indicate a reaction to generate the mold-release acceleration substance.

In the mold-release acceleration gas supplying step, the mixed gas A3, which has been heated to the softening temperature of the optical material 104 (a glass-transition temperature) or higher by the gas-heating heater 19a, is supplied to the cavity 105, thereby heating and softening the optical material 104 (a heating and softening step).

As described above, while the mold-release acceleration gas supplying step is performed by the mixed gas A3, the heating and softening step is also performed by the mixed gas A3. The mold-release acceleration gas supplying step and the heating and softening step may also be performed sequentially one by one. In the present embodiment, the mold-release acceleration gas supplying step is also performed in a pressurizing step after the heating and softening step. In the mold-release acceleration gas supplying step, the mixed gas A3 (the mold-release acceleration substance) may be supplied to the cavity 105 before the completion of pressurization and transformation of the optical material 104.

Since the upper soaking plate 13 has been abutting the top surface of the upper mold 101 of the mold set 100, heat generated from the heaters 11a and 12a is conducted to the mold set 100 via the upper heating block 11, the lower heating block 12, the upper soaking plate 13, and the lower soaking plate 14, and it is eventually conducted to the optical material 104. This also heats and softens the optical material 104.

Accordingly, the heater 19a at the mixed gas supply path 19 may be omitted. Instead, the heaters 11a and 12a at the upper heating block 11 and the lower heating block 12 may be omitted.

After the optical material 104 is heated and softened, the mold set 100 is transported to the pressurizing stage by a transportation robot (not shown). After this, a drive unit (not illustrated) causes the ascending and descending axis 15, the upper heating block 11, and the upper soaking plate 13 to descend so that the upper soaking plate 13 presses against the upper mold 101 as illustrated in FIG. 2B. As a result, the upper mold 101 and the lower mold 102 come relatively close to each other, and hence the optical material 104 is pressurized and transformed (the pressurizing step). At an early stage of the pressurizing step, the mixed gas supply path 19 also supplies the mixed gas A3 with volume flow rate V1 $[m^3/s]$ to the cavity 105.

As the pressurization and transformation of the optical material 104 progresses, the mixed gas supply path 19 supplies, to the cavity 105, a larger amount of mixed gas A3, i.e., the mixed gas A3 with volume flow rate V2 (>V1) $[m^3/s]$.

Accordingly, the mold-release acceleration substance can be supplied to the edge (periphery) of the optical material 104 without fail.

The process for supplying the mixed gas A3 with volume flow rate V1 [m³/s] to the cavity 105 and the process for supplying the mixed gas A3 with volume flow rate V2 [m³/s] to the cavity 105 may be performed in different pressurizing stages or may be performed in the same pressurizing stage.

After the pressurizing stage, the mold set 100 is transported to the cooling stage by a transportation robot (not illustrated). In the cooling stage, the temperatures of the heaters 11a and 12a of the upper heating block 11 and the lower heating block 12 are set to a cooling temperature by a control unit (not illustrated), and the optical material 104 is cooled while the upper soaking plate 13 and the lower soaking plate 14 abut the mold set 100 (a cooling step).

After this, a transportation robot (not illustrated) carries the mold set 100 out of the manufacturing apparatus 10 for manufacturing an optical element, and a mold release robot (not illustrated) then takes the optical material 104 out of the mold set 100 (a mold release step). As a result, an optical element, which is, for example, a glass lens, is obtained.

Figure 3A:
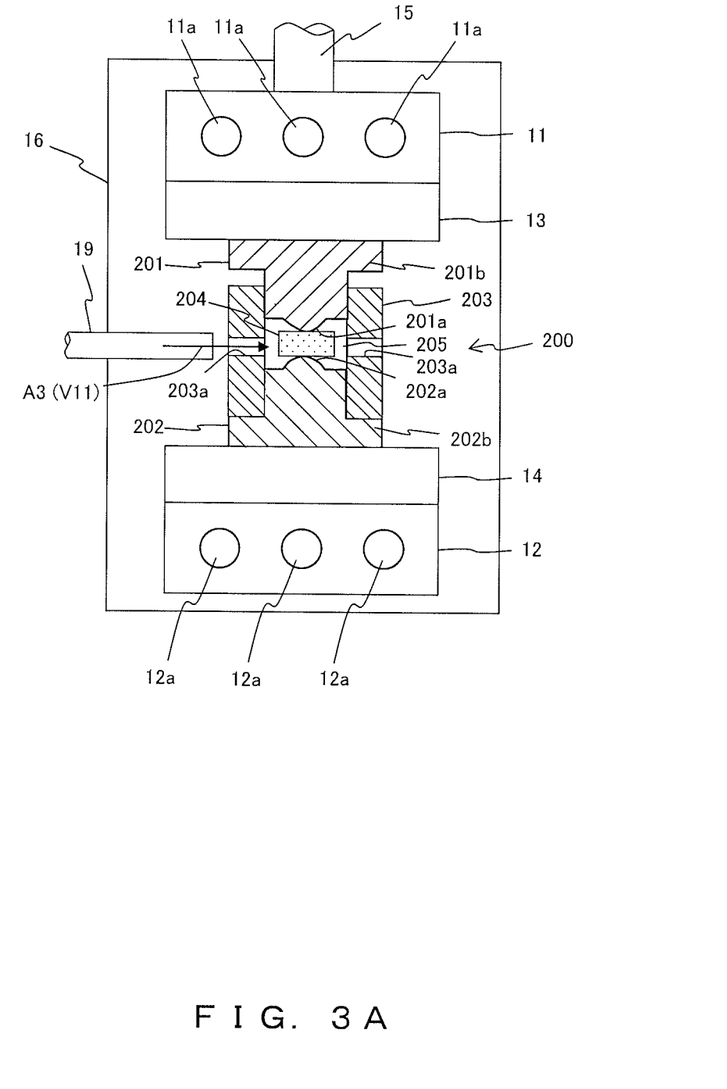
FIG. 3A is an explanatory diagram (pattern 1) illustrating a flow for manufacturing a double-concave lens with the manufacturing apparatus for manufacturing an optical element according to the first embodiment of the present invention.
Figure 3B:
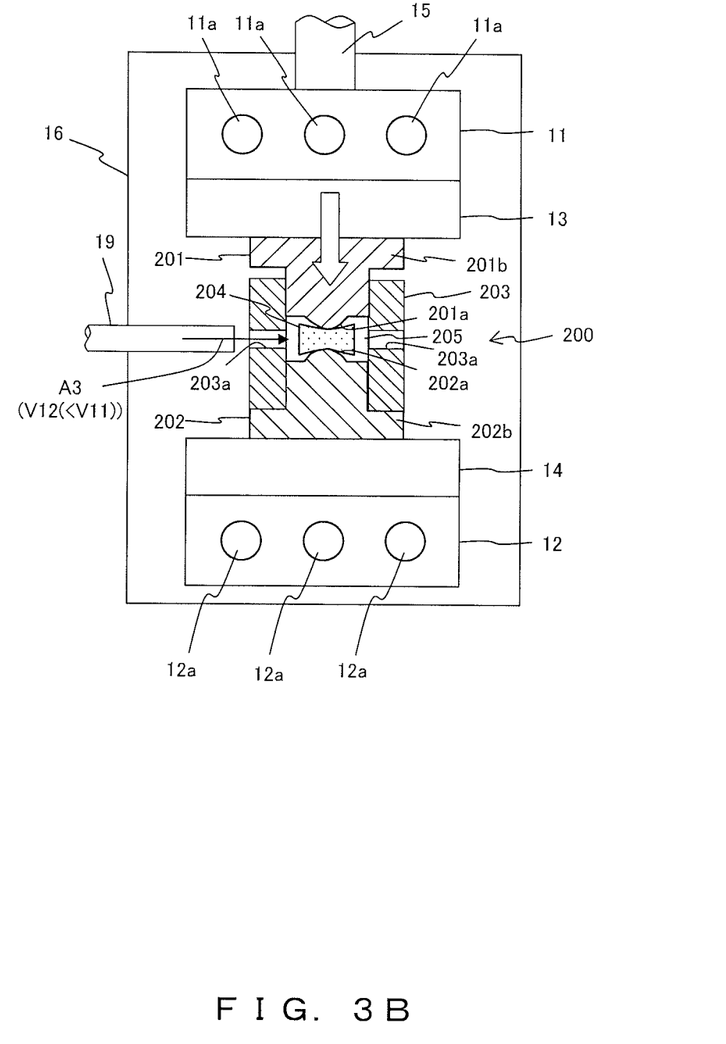
FIG. 3B is an explanatory diagram (pattern 2) illustrating a flow for manufacturing a double-concave lens with the manufacturing apparatus for manufacturing an optical element according to the first embodiment of the present invention.
Figure 3C:
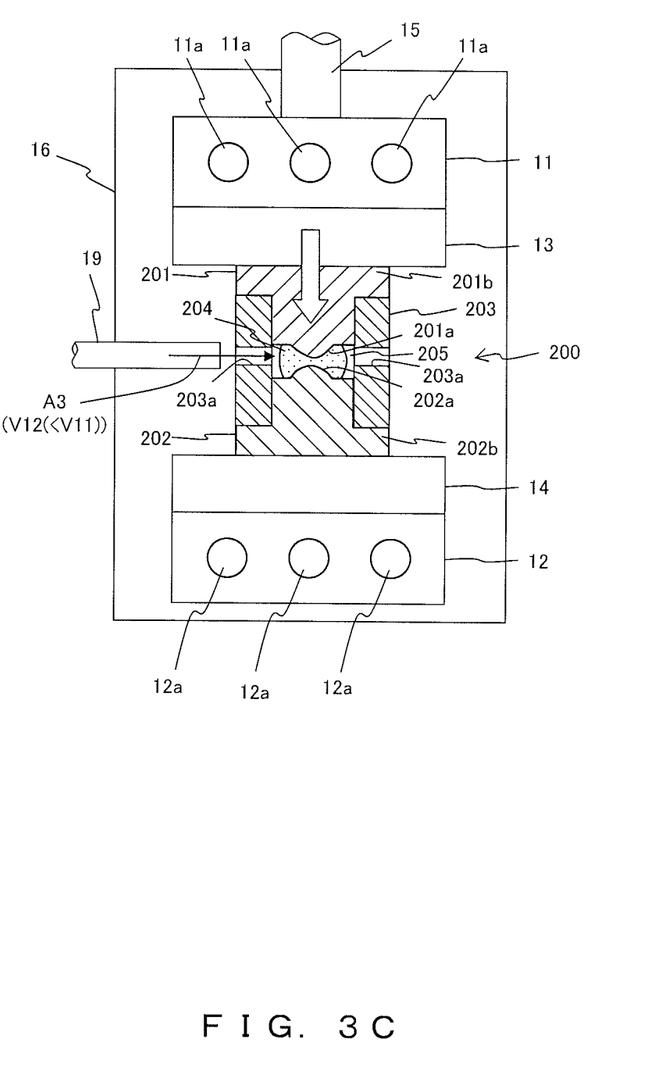
FIG. 3C is an explanatory diagram (pattern 3) illustrating a flow for manufacturing a double-concave lens with the manufacturing apparatus for manufacturing an optical element according to the first embodiment of the present invention.

FIGS. 3A-3C are each an explanatory diagram illustrating a flow for manufacturing an optical element, a double-concave lens, with the manufacturing apparatus 10 for manufacturing an optical element according to the first embodiment.

As illustrated in FIG. 3A, a mold set 200 for manufacturing the optical element which is a double-concave lens also includes an upper mold 201 as a first mold, a lower mold 202 as a second mold, and a sleeve 200.

The mold set 200 is different from the mold set 100 described above in the sense that, on the end surfaces of the upper mold 201 and the lower mold 202 which face each other, convex mold surfaces 201a and 202a, not concave mold surfaces, are formed for impressing a double-concave shape onto an optical material 204.

Also in the mold set 200, large diameter parts 201b and 202b are formed on the upper mold 201 and the lower mold 202, and a plurality of through-holes 203a are formed on the sleeve 203.

When an attempt is made to manufacture an optical element which is a double-concave lens, the optical material 204 is first heated and softened by the aforementioned heaters 11a and 12a and a mixed gas A3 with volume flow rate V11 [m³/s] (the heating and softening step and the mold-release acceleration gas supplying step). Then, in the pressurizing step, the mixed gas supply path 19 supplies, to the cavity 20, a smaller amount of mixed gas A3 than the mixed gas A3 in the heating and softening step, i.e., the mixed gas A3 with volume flow rate V12 (<V11) [m³/s] (the pressurizing step and the mold-release acceleration gas supplying step).

This process is performed in order to prevent a degradation of the impressing quality of the convex mold surfaces 201a and 202a which would be caused when a force to push the optical material 204 toward the circumference direction becomes strong due to enhancement of flowability of the edge (periphery) of the optical material 204.

After the pressurizing step, the cooling step and the mold release step described above are performed.

In the present embodiment described above, the manufacturing method for manufacturing an optical element includes: a mold-release acceleration gas supplying step of supplying the mixed gas A3 containing a mold-release acceleration substance (the mold-release acceleration gas A2) to the cavity (105, 205) which is the space between the upper mold (101, 102) and the lower mold (102, 202) and which sandwich the optical material (104, 204) and face each other; and a pressurizing step of pressurizing and transforming the optical material (104, 204) by bringing the upper mold (101, 201) and the lower mold (102, 202) relatively close to each other.

Accordingly, even if a portion of the optical material (104, 204) is newly exposed due to enlargement of the surface area of the optical material (104, 204) which would be caused when the shape of the optical material (104, 204) is transformed, the mold-release acceleration gas A2 can be sprayed onto the newly exposed portion by supplying the mold-release acceleration gas A2 to the cavity (105, 205). Thus, it is possible to prevent an occurrence of fusion bonding of the optical material (104, 204) and the mold (the upper mold (101, 201) and the lower mold (102, 202)), which would spread from the newly exposed portion.

Accordingly, according to the present embodiment, the mold-release characteristics between the optical material (104, 204) and the mold (the upper mold (101, 201) and the lower mold (102, 202)) can be improved.

In addition, in order to supply a mold-release acceleration substance to the cavity (105, 205) while it is in a gaseous state (the mixed gas A3), the timing of the supply of the gas and the amount of the gas to be supplied can easily be controlled, and the selection of a gas, which depends on the type of the optical material (104, 204), can easily be controlled; accordingly, the degree of freedom in the supply of the mold-release acceleration substance is enhanced.

In the present embodiment, the manufacturing method for manufacturing an optical element includes the heating and softening step of heating and softening the optical material (104, 204) by heating the inert gas A1 as a heating and softening gas and supplying it to the space between the upper mold (101, 201) and the lower mold (102, 202), wherein the heating and softening step is performed before the pressurizing step. Accordingly, the heated inert gas A1 can heat the edge (periphery) of the optical material (104, 204), thereby heating and softening the entirety of the optical material (104, 204) more equally.

In the present embodiment, the gas containing a mold-release acceleration substance and supplied to the cavity (105, 205) is the mixed gas A3, which is a mixture of the inert gas A1 and the mold-release acceleration substance (the mold-release acceleration gas A2). Accordingly, the mold-release acceleration substance can be supplied to the cavity (105, 205) while preventing oxidation of the cavity (105, 205) with the inert gas A1. It is also possible to prevent the gas containing a mold-release acceleration substance from decreasing (changing) the temperature of the optical material (104, 204).

According to the present embodiment, in the heating and softening step, the inert gas A1 is heated via the mixed gas A3 being heated. In addition, in the present embodiment, at least a portion of the mold-release acceleration gas supplying step is performed simultaneously with the heating and softening step. Accordingly, the configuration of the manufacturing apparatus 10 for manufacturing an optical element can be simplified.

According to the present embodiment, in the heating and softening step, the inert gas A1 is heated after the inert gas A1 and the mold-release acceleration substance (the mold-release acceleration substance A2) are mixed together. Accordingly, when the raw material for the mold-release acceleration substance is mixed, the raw material can indicate a reaction to turn into the mold-release acceleration substance while the inert gas A1 is heated, and hence the configuration of the manufacturing apparatus 10 for manufacturing an optical element can be simplified. Meanwhile, the inert gas A1 and the mold-release acceleration substance (the mold-release acceleration gas A2) are easily mixed together, and hence mold-release characteristics of the outer surface of the optical material (104, 204) can be equally improved.

According to the present embodiment, in the mold-release acceleration gas supplying step, the amount of the supplied mixed gas A3 (volume flow rates V1, V2, V11, V12) changes in the process of changing the shape of the optical material (104, 204). Accordingly, an amount of a mold-release acceleration substance which depends on the shape of the optical material (104, 204) and the shape of an optical element to be manufactured can be supplied to the cavity 105. In addition, since the flow of the optical material (104,204) can be controlled, an optical element of a good impressing quality can be obtained.

In the present embodiment, the amount of the supply of mold-release acceleration substance is changed depending on the volume flow rate of the mixed gas A3; however, the amount of mold-release acceleration substance contained in the mold-release acceleration gas A2 may be increased even when the volume flow rate of the mixed gas A3 is fixed, or the amount of the supply of the mold-release acceleration substance may be changed by decreasing the amount of the supply of the inert gas A2 and increasing the amount of the supply of the mold-release acceleration gas A2. The amount of the supply of the mixed gas A3 may be changed more than once in the process of changing the shape of the optical material (104, 204).

In regard to the present embodiment, descriptions have been given under the conditions that the optical element is a double-convex lens (the optical material 104) and that the optical element is a double-concave leans (the optical material 204); however, the shape of the optical element is not particularly limited, and hence it may be a single-convex lens or the like.

In regard to the present embodiment, an example has been described in which, in the manufacturing apparatus 10 for manufacturing an optical element, a plurality of stages including the upper heating block 11, the lower heating block 12, the upper soaking plate 13, the lower soaking plate 14, and the ascending and descending axis 15 are placed; however, the configuration may be made such that there is only a single stage. In this case, the upper mold (101, 201) and the lower mold (102, 202) may be fixed on the stage while removing the mold set (100, 200).

SECOND EMBODIMENT

Figure 4:
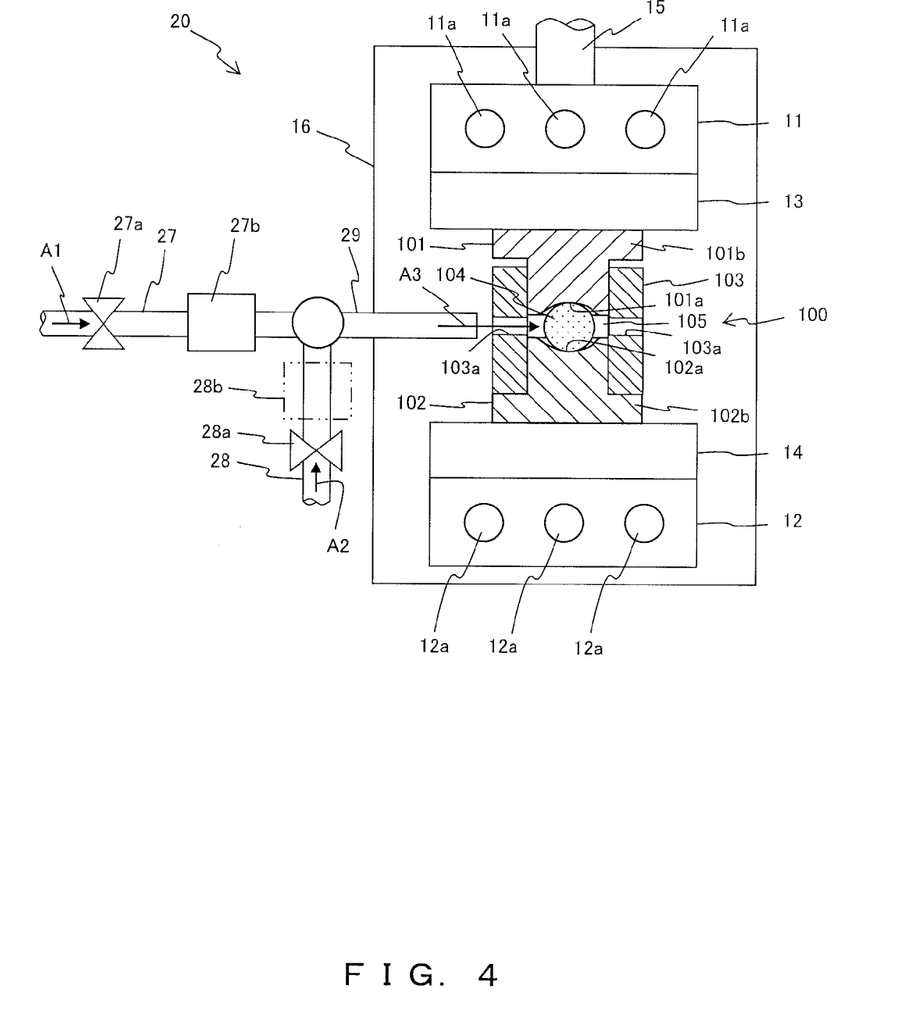
FIG. 4 is a schematic configuration diagram illustrating a manufacturing apparatus for manufacturing an optical element according to a second embodiment of the present invention.

FIG. 4 is a schematic configuration diagram illustrating a manufacturing apparatus 20 for manufacturing an optical element according to a second embodiment of the present invention.

The manufacturing apparatus 20 for manufacturing an optical element according to the present embodiment is similar to the manufacturing apparatus 10 for manufacturing an optical element according to the first embodiment described above except for the fact that a gas-heating heater 27b is not provided at a mixed gas supply path 29 but it is provided at an inert gas supply path 27 and except for the difference associated with this fact. Accordingly, descriptions of similarities are appropriately omitted.

As illustrated in FIG. 4, the manufacturing apparatus 20 for manufacturing an optical element includes: an upper heating block 11 and a lower heating block 12; an upper soaking plate 13 and a lower soaking plate 14; an ascending and descending axis 15; a molding chamber 16; an inert gas supply path 27; a mold-release acceleration gas supply path 28; and a mixed gas supply path 29.

The inert gas supply path 27 constitutes a channel for supplying an inert gas A1, which is, for example, nitrogen or helium, from a supply source (not illustrated) to a cavity 105.

The mold-release acceleration gas supply path 28 constitutes a channel for supplying a mold-release acceleration gas A2, which is a gas containing a mold-release acceleration substance, from a supply source (not illustrated) to the cavity 105.

The inert gas supply path 27 and the mold-release acceleration gas supply path 28 are provided with adjustment valves 27a and 28a, which are controlled by a control unit (not illustrated), to adjust the flow rate.

The inert gas supply path 27 and the mold-release acceleration gas supply path 28 are coupled to the mixed gas supply path 29. The mixed gas supply path 29 constitutes a channel for supplying, to the cavity 105, a mixed gas A3 which is a mixture of the inert gas A1 supplied by the inert gas supply path 27 and the mold-release acceleration gas A2 (the mold-release acceleration substance) supplied by the mold-release acceleration gas supply path 28. As described above, the mold-release acceleration gas supply path 28 and the mixed gas supply path 29 together function as a mold-release acceleration gas supply unit which supplies a gas containing a mold-release acceleration substance to the cavity 105.

The inert gas supply path 27 is provided with a gas-heating heater 27b which heats the invert gas A1 to, for example, the softening temperature of the optical material 104 (a glass-transition temperature) or higher.

The mold-release acceleration gas supply path 28 may be provided with a gas-heating heater 28b (illustrated using a chain double-dashed line) as a mold-release-acceleration substance reacting unit, which is, for example, a torch heater using a platinum heating element. In this case, the mold-release acceleration gas A2 within the mold-release acceleration gas supply path 28 may contain a raw material for the mold-release acceleration substance. This raw material reacts by being heated by the gas-heating heater 28b, thereby generating the mold-release acceleration substance.

The flow for manufacturing an optical element from the optical material 104 is similar to the flow in the first embodiment.

As with the first embodiment, the manufacturing method for manufacturing an optical element according to the present invention includes: a mold-release acceleration gas supplying step of supplying the mixed gas A3 which is a gas containing a mold-release acceleration substance (the mold-release acceleration gas A2); and a pressurizing step of pressurizing and transforming the optical material 104 by bringing the upper mold 101 and the lower mold 102 relatively close to each other.

Accordingly, even if a portion of the optical material 104 is newly exposed due to enlargement of the surface area of the optical material 104, which would be caused when the shape of the optical material 104 is transformed, the mold-release acceleration gas A2 can be sprayed onto the newly exposed portion by supplying the mold-release acceleration gas A2 to the cavity 105. Thus, it is possible to prevent an occurrence of fusion bonding of the optical material 104 and the mold (the upper mold 101 and the lower mold 102), which would spread from the newly exposed portion.

Accordingly, according to the present embodiment, the mold-release characteristics between the optical material 104 and the mold (the upper mold 101 and the lower mold 102) can be improved.

According to the present embodiment, in the heating and softening step, the inert gas A1 is heated before it is mixed with a mold-release acceleration substance (the mold-release acceleration gas A2). Accordingly, a configuration in which a mold-release acceleration substance is not heated by a gas-heating heater, so that the mold-release acceleration substance is in a solid state while it is supplied to the cavity 105; a configuration in which, when a raw material for a mold-release acceleration substance is used, the gas-heating heater 28b for heating the raw material is used since the reaction temperature of the raw material is different from the heating temperature achieved by the gas-heating heater 27b; and other configurations can be effectively employed.

THIRD EMBODIMENT

Figure 5:
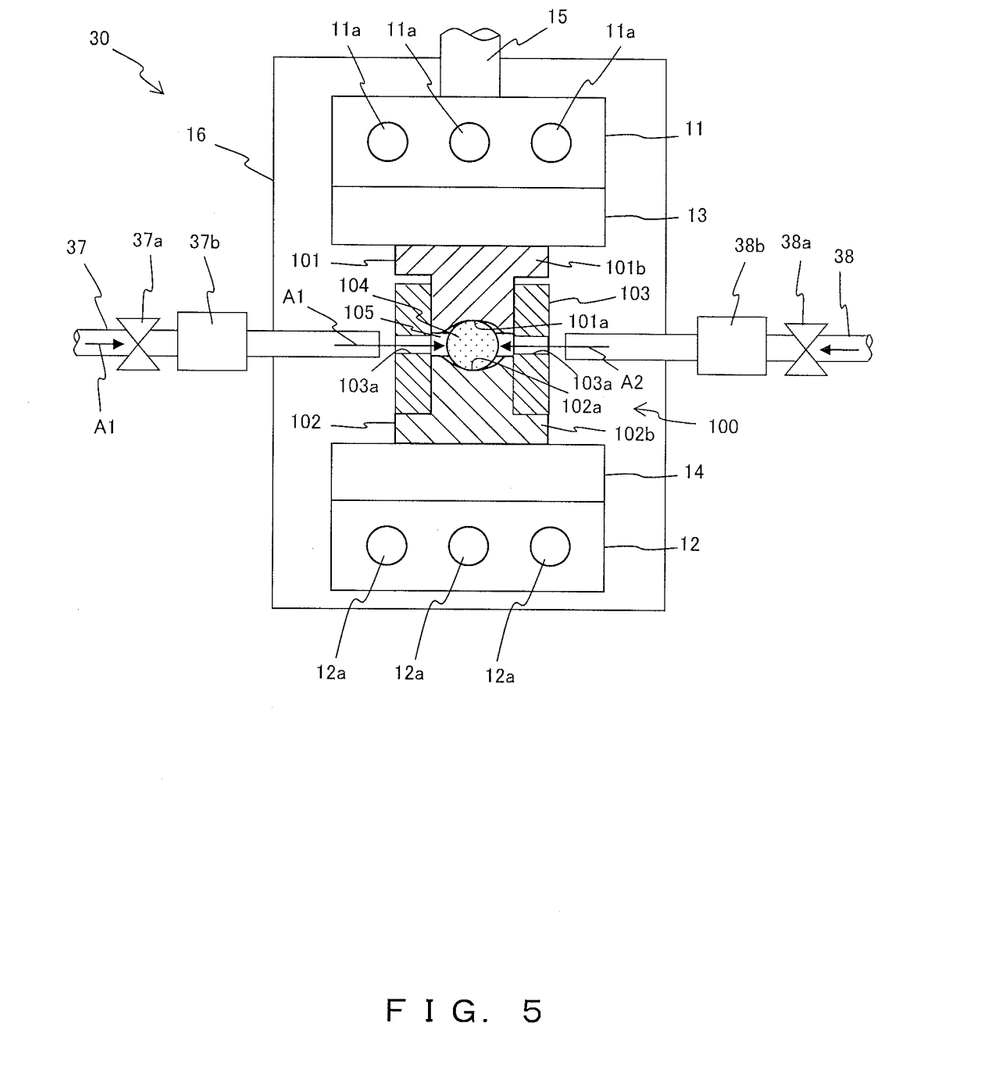
FIG. 5 is a schematic configuration diagram illustrating a manufacturing apparatus for manufacturing an optical element according to a third embodiment of the present invention.

FIG. 5 is a schematic configuration diagram illustrating a manufacturing apparatus 30 for manufacturing an optical element according to a third embodiment of the present invention.

The manufacturing apparatus 30 for manufacturing an optical element according to the present embodiment is similar to the manufacturing apparatus 10 for manufacturing an optical element according to the first embodiment described above except for the fact that the mold-release acceleration gas A2 is supplied to the cavity 105 separately from the inert gas A1 (i.e., supplied using a different system) and except for the difference associated with this fact. Accordingly, descriptions of similarities are appropriately omitted.

As illustrated in FIG. 5, the manufacturing apparatus 30 for manufacturing an optical element includes: an upper heating block 11 and a lower heating block 12; an upper soaking plate 13 and a lower soaking plate 14; an ascending and descending axis 15; a molding chamber 16; an inert gas supply path 37; and a mold-release acceleration gas supply path 38.

The inert gas supply path 37 constitutes a channel for supplying an inert gas A1, which is, for example, nitrogen or helium, from a supply source (not illustrated) to a cavity 105.

The mold-release acceleration gas supply path 38 constitutes a channel for supplying a mold-release acceleration gas A2, which is a gas containing a mold-release acceleration substance, from a supply source (not illustrated) to the cavity 105. The mold-release acceleration gas supply path 38 functions as the mold-release acceleration gas supply unit.

The inert gas supply path 37 and the mold-release acceleration gas supply path 38 are provided with adjustment valves 37a and 38a, which are controlled by a control unit (not illustrated) to adjust the flow rate.

The inert gas supply path 37 and the mold-release acceleration gas supply path 38 are provided with gas-heating heaters 37b and 38b. The gas-heating heater 38b at the mold-release acceleration gas supply path 38 can be caused to function as the aforementioned mold-release-acceleration substance reacting unit.

The inert gas supply path 37 and the mold-release acceleration gas supply path 38 are placed independently from each other, and they respectively supply the inert gas A1 and the mold-release acceleration gas A2 separately (i.e., using different systems) from different through-holes 103a at the sleeve 103 to the cavity 105.

However, the inert gas A1 may be supplied to the cavity 105 simultaneously with the supply of the mold-release acceleration gas A2 to the cavity 105. As an example, as with the first embodiment, a portion of the mold-release acceleration gas supplying step may be performed simultaneously with the heating and softening step. The timings of supplying the gases are not particularly limited.

The inert gas supply path 37 is provided with a gas-heating heater 37b which heats the inert gas A1.

The mold-release acceleration gas supply path 38 is provided with a gas-heating heater 38b which heats the mold-release acceleration gas A2.

The flow for manufacturing an optical element from the optical material 104 is similar to the flow in the first embodiment.

As with the first and second embodiments, the manufacturing method for manufacturing an optical element according to the present invention includes: a mold-release acceleration gas supplying step of supplying the mold-release acceleration gas A2 which is a gas containing a mold-release acceleration substance; and a pressurizing step of pressurizing and transforming the optical material 104 by bringing the upper mold 101 and the lower mold 102 relatively close to each other.

Accordingly, even if a portion of the optical material 104 is newly exposed due to enlargement of the surface area of the optical material 104 which would be caused when the shape of the optical material 104 is transformed, the mold-release acceleration gas A2 can be sprayed onto the newly exposed portion by supplying the mold-release acceleration gas A2 to the cavity 105. Thus, it is possible to prevent an occurrence of fusion bonding of the optical material 104 and the mold (the upper mold 101 and the lower mold 102) which would spread from the newly exposed portion.

Accordingly, according to the present embodiment, the mold-release characteristics between the optical material 104 and the mold (the upper mold 101 and the lower mold 102) can also be improved.

In the present embodiment, the mold-release acceleration gas A2 is supplied to the cavity 105 separately from the inert gas A1. Therefore, a configuration in which, when a raw material for a mold-release acceleration substance is used, the reaction temperature of the raw material (the heating temperature achieved by the gas-heating heater 38b) is different from the heating temperature achieved by the gas-heating heater 37b and a configuration in which a position at which the optical material 104 is desired to be heated is different from a position to which the mold-release acceleration substance is desired to be supplied can be effectively employed.

What is claimed is:

1. A manufacturing method for manufacturing an optical element, the method comprising:
   supplying a gas containing a mold-release acceleration substance to a space between a first mold and a second mold which sandwich an optical material;
   heating an inert gas and supplying the heated inert gas to the space between the first and second molds to heat and soften the optical material; and
   pressurizing and transforming the heated and softened optical material by moving the first and second molds towards each other,
   wherein the mold-release acceleration substance is generated by heating raw material for the mold-release acceleration substance,
   wherein the step of supplying the gas containing the mold-release acceleration substance comprises reducing an amount of the mold-release acceleration substance supplied to the space between the first mold and the second mold during the pressuring and transforming step, and
   wherein the mold-release acceleration substance is at least one of a hydrocarbon and graphite, or the mold-release acceleration substance is obtained by a reaction of a hydrocarbon or a halogenated hydrocarbon in a raw material form.

2. The manufacturing method for manufacturing an optical element according to claim 1, wherein the gas containing the mold-release acceleration substance is a mixed gas which is a mixture of the inert gas and the mold-release acceleration substance, the step of heating the inert gas comprises heating the mixed gas, and the step of supplying the gas containing the mold-release acceleration substance is at least partially performed simultaneously with the step of heating and softening the optical material.

3. The manufacturing method for manufacturing an optical element according to claim 1, wherein the step of supplying the gas containing the mold-release acceleration substance to the space between the first and second molds is performed independently from the step of supplying the heated inert gas.

4. A manufacturing apparatus for manufacturing an optical element, the apparatus comprising:

a mold-release acceleration gas supply unit having:

a gas heater for heating raw material for a mold-release acceleration substance to generate the mold-release acceleration substance, and an adjustment valve configured to supply a gas containing the mold-release acceleration substance at a first flow rate to a space between a first mold and a second mold which sandwich an optical material;

an inert gas supply unit having a heater for heating an inert gas and supplying the heated inert gas to the space between the first and second molds to heat and soften the optical material; and a pressurization unit with a drive unit configured to move the first and second molds towards each other to pressurize and transform the heated and softened optical material, wherein in response to the drive unit moving the first and second molds towards each other, the mold-release acceleration gas supply unit adjusts the adjustment valve to reduce the first flow rate of the gas containing the mold-release acceleration substance supplied to the space between the first mold and the second mold, and wherein the mold-release acceleration substance is at least one of a hydrocarbon and graphite, or the mold-release acceleration substance is obtained by a reaction of a hydrocarbon or a halogenated hydrocarbon in a raw material form.

5. The manufacturing apparatus for manufacturing an optical element according to claim 4, further comprising a mixed gas supply path that mixes the gas containing the mold-release acceleration substance and the inert gas before it is supplied to the space between the first and second molds.

6. The manufacturing apparatus for manufacturing an optical element according to claim 5, wherein the gas heater of the mold-release acceleration gas supply unit is further configured to heat the mixed gas before it is supplied to the space between the first and second molds.

7. The manufacturing apparatus for manufacturing an optical element according to claim 4, wherein the mold-release acceleration gas supply unit supplies the gas containing the mold-release acceleration substance to the space between the first and second molds independently from the inert gas supply unit supplying the heated inert gas.

* * * * *